(12) United States Patent
Ross

(10) Patent No.: US 6,315,849 B1
(45) Date of Patent: Nov. 13, 2001

(54) METHOD OF JOINING FLEXIBLE SHEETS TO TUBES

(75) Inventor: Kurt D. Ross, El Paso, TX (US)

(73) Assignee: Grayling Industries, Inc., Alpharetta, GA (US)

( * ) Notice: Subject to any disclaimer, the term of this patent is extended or adjusted under 35 U.S.C. 154(b) by 0 days.

(21) Appl. No.: 09/317,464

(22) Filed: May 24, 1999

(51) Int. Cl.$^7$ .................................................. B29C 53/00
(52) U.S. Cl. .................. 156/215; 156/229; 156/258; 156/293; 156/308.4
(58) Field of Search .................... 156/160, 196, 156/211, 212, 215, 229, 250, 256, 258, 293, 308.4; 604/326

(56) References Cited

U.S. PATENT DOCUMENTS

| | | | |
|---|---|---|---|
| 4,852,687 | 8/1989 | Hittler | 182/129 |
| 5,553,933 | 9/1996 | Ross | 312/1 |
| 5,632,846 | 5/1997 | Ross | 156/308.4 |
| 5,827,598 * | 10/1998 | Larsen et al. | 156/293 |

* cited by examiner

*Primary Examiner*—Michael W. Ball
*Assistant Examiner*—John T. Haran
(74) *Attorney, Agent, or Firm*—Baker, Donelson, Bearman & Caldwell

(57) ABSTRACT

A plastic tube is joined to a flexible plastic sheet by mounting an end of the tube over a mandrel. A hole is cut in the sheet of a size less than the mandrel. The sheet is stretched over the mandrel bringing an annular portion of the sheet about the hole snugly over the tube end and mandrel. The annular portion of the sheet is heat sealed to the tube end and the joined sheet and tube removed from the mandrel.

2 Claims, 3 Drawing Sheets

METHOD OF JOINING FLEXIBLE SHEETS TO TUBES

TECHNICAL FIELD

This invention relates to methods of joining flexible sheets to tubes.

BACKGROUND OF THE INVENTION

There are many articles of manufacture that have plastic tubes joined to flexible plastic sheets. For example, many products are packaged in plastic wrap which, because of the shapes of the products, dictate that the packages have tubular extensions. Other flexible containers are in the form of tubes with end flanges. Asbestos abatement containers fall in this category. For example, U.S. Pat. No. 4,852,687 illustrates a plastic enclosure for collecting asbestos as it is stripped from a ceiling. The enclosure has a funnel like enclosure from which a chute depends. Glove bags that are wrapped about asbestos clad pipes also have one or more tubes that depend from a shroud. Examples of these are shown in U.S. Pat. Nos. 5,553,933 and 5,632,846. Intravenous drip tubes used in medical facilities to meter fluids slowly into patients also have fitment tubes joined to pouches that are suspended from stands.

Plastic tubes can be and often are joined to plastic sheet materials with adhesives and with tapes. However, for speed and consistency, more often they are heat sealed which causes the plastics to fuse and provide a watertight or airtight joint. Heretofore this has commonly been done as shown in FIGS. 1–5 of the drawing. A plastic tube 10 is inserted through a tubular mandrel or anvil 12 having an annular step 13 in one end as shown in FIG. 1. An end of the tube is folded outwardly over the end of the mandrel as shown in FIG. 2 to form an annular tube lip 14. A plastic sheet 15 is positioned over the mandrel and tube lip as shown in FIG. 4. A sealing platen then presses the sheet against the tube lip 14 and the contiguous annular portion Of the tube that overlays the mandrel step. The platen is sometimes in the shape of a donut as shown at 17 in FIG. 3 or other times it is a disc as shown at 18 in FIG. 4. The sheet can have a precut hole or the hole can be formed in the sheet with an annular, electric cutting wire 19 affixed to the platen 18 as shown in FIG. 4. The sheet is then fused to the tube lip with heat generated by unshown electric heating elements in the mandrel or platen. The bonded tube and sheet are then removed as shown in FIG. 5.

A persistent problem with the just described method is that it produces pinholes in the seal that cause capillary leaks. This is due to the fact that the stretching of the tube end over the mandrel causes it to gather and wrinkle as indicated in FIGS. 2–4. Once these wrinkles are pressed against the flat sheet, radiating capillary channels are formed as the two layers are sealed.

Accordingly, it is seen that a need has long existed for a method of joining a plastic tube to a flexible plastic sheet in a manner that provides an air impervious annular seal that is substantially free of capillary leaks. It is to the provision of such therefore that the present invention is primarily directed.

SUMMARY OF THE INVENTION

In a preferred form of the invention, a plastic tube is joined to a flexible plastic sheet by mounting an end of the tube over a mandrel of a given size. A hole is cut in the sheet of a size less than the mandrel. The sheet is stretched over the mandrel bringing a portion of the sheet about the hole snugly over the tube end and mandrel. That portion of the sheet is then heat sealed to the tube end, and the joined sheet and tube removed from the mandrel.

If the plastic tube is substantially rigid it need not be mounted to a mandrel. In that case the sheet is stretched directly over the tube.

DETAILED DESCRIPTION

Figure 1:
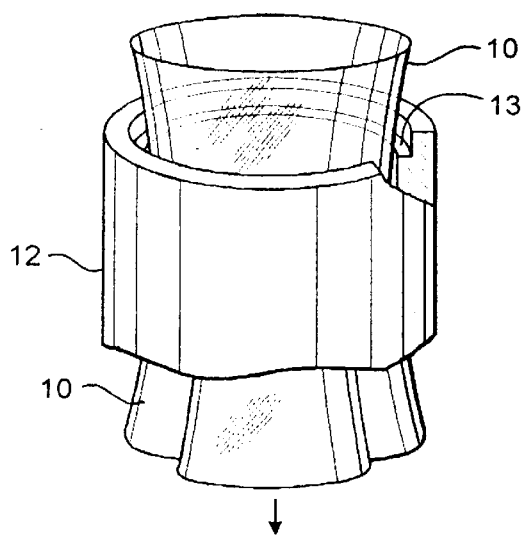
FIGS. 1–5 provide a series of perspective views of a mandrel showing a flexible tube being joined to a flexible sheet thereon as has been done in the past.
Figure 2:
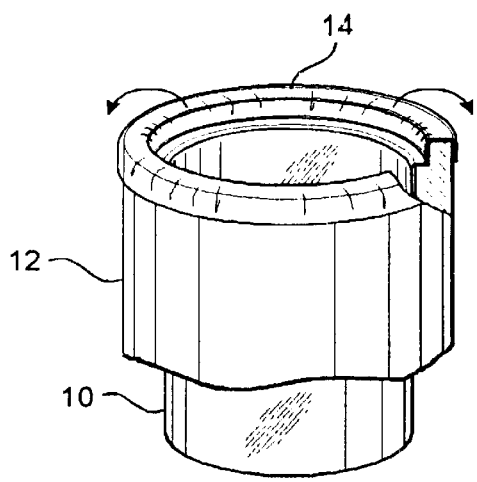
Figure 3:
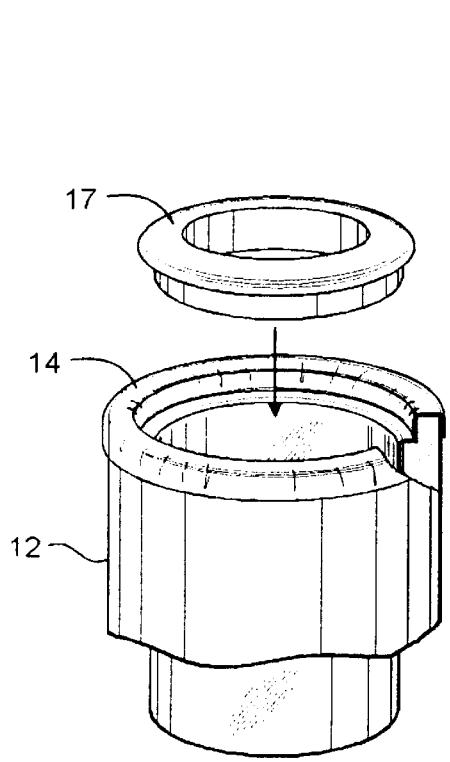
Figure 4:
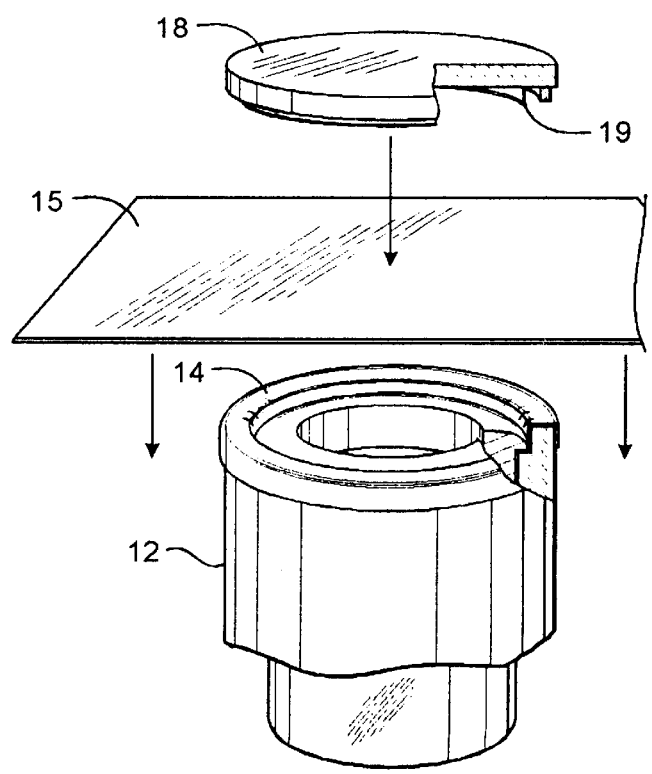
Figure 5:
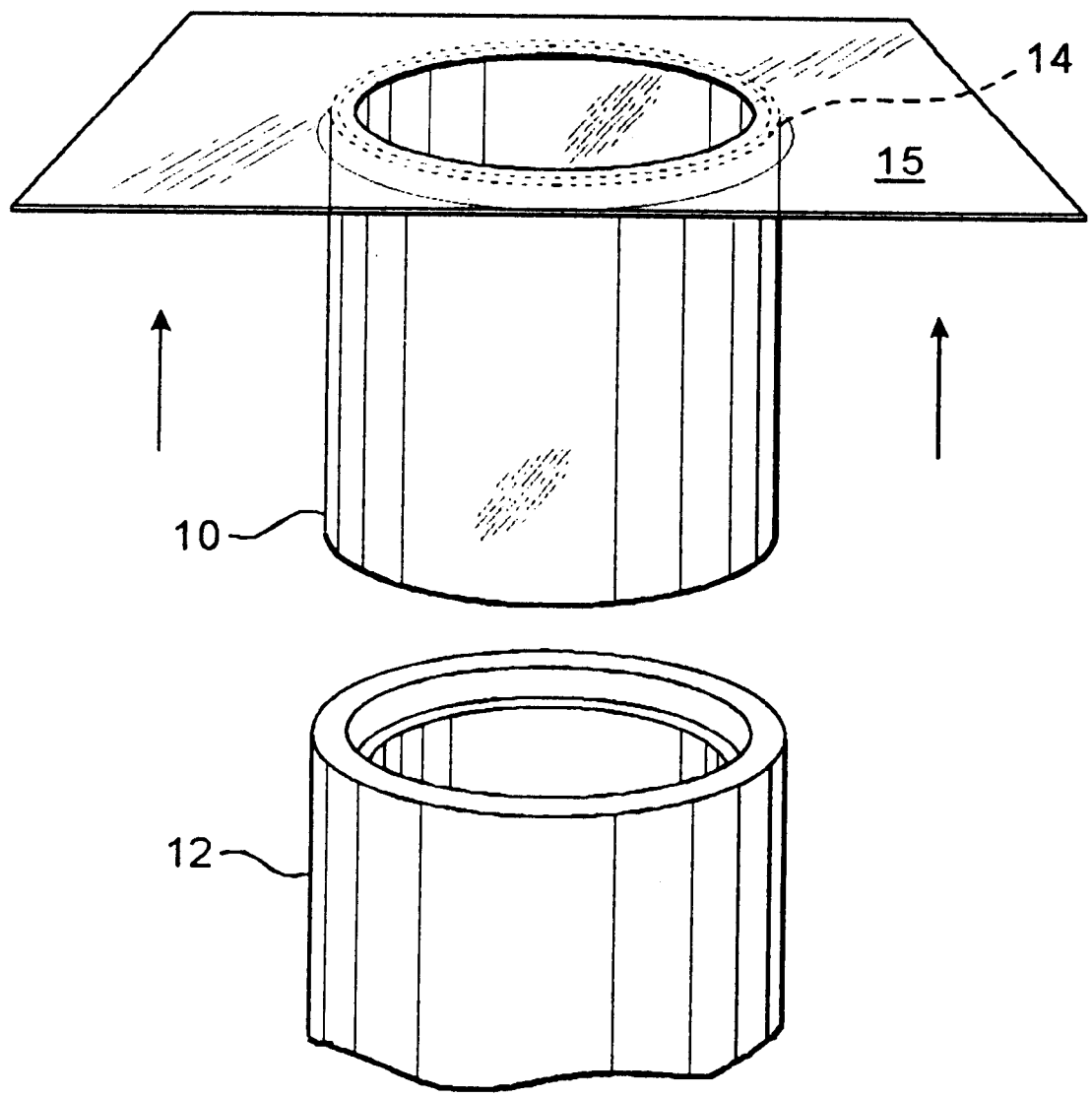
Figure 6A:
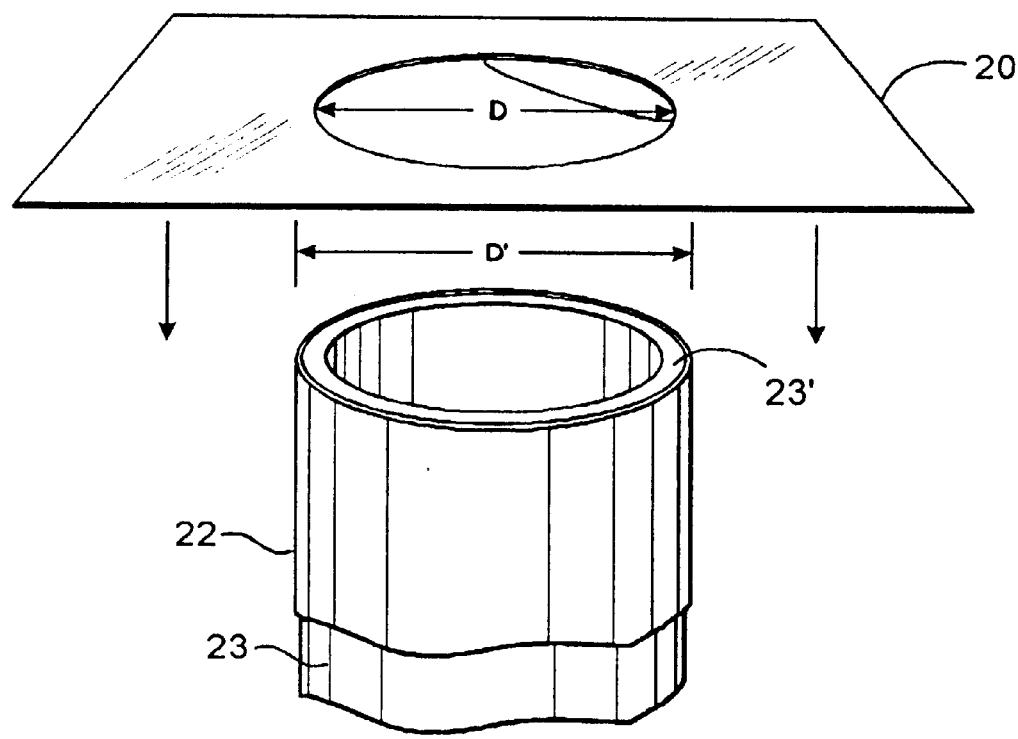
FIGS. 6a–6b provide a series of perspective views of a mandrel showing a flexible tube being joined to a flexible sheet thereon in accordance with the present invention.
Figure 6B:
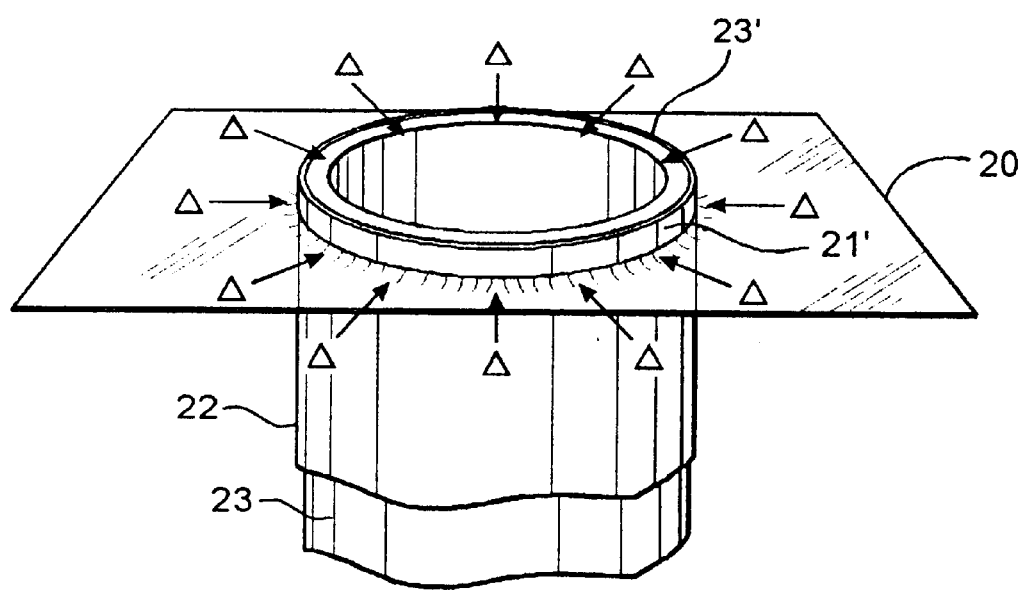

With reference again to the drawing, these is shown in FIG. 6a a flexible plastic sheet 20 with a hole 21 therethrough of a diameter D being joined to the end of a plastic tube 22 in accordance with the present invention. These materials may, for example, be stretchable polyethylene of some one-half to ten mils thick. The tube may be flexible or rigid. The tube 22 is first fitted snugly over a cylindrical mandrel 23 which has a diameter D' slightly larger than the diameter D of the sheet hole 21. The sheet 20 is then drawn down over the mandrel end 23'. This causes the sheet to stretch so as to enlarge the hole 21. Here the sheet and tube are shown spatially separated from each other and from the mandrel, but only for clarity of illustration since they actually are flushly engaged. Once the sheet is in place for sealing as shown in FIG. 6b it unfurls outwardly from its taut annular portion that overlies the mandrel and the end of the plastic tube 22. Its overlying annular portion is taut because in this annular region it is stretched. However, being stretched in this manner it does not have wrinkles that create capillary channels. It is believed that being stretched in this manner instead of the manner as shown in FIGS. 1–5 leads to its wrinkle free condition due to the fact that the diameter of its entire stretched portion 21', shown in FIG. 6b, is the same. Conversely, the diameter of the stretched tube lip 14 of the prior art increased from its inside annular edge to its outside annular edge.

With the sheet now drawn tightly over the end of the tube on the mandrel, it is ready for sealing. This can be done in many ways. However, preferably it is done with four angularly spaced, arcuate heat sealers. The four heat sealers or discs are drawn radially inwardly against the sheet and tube causing the spaced portions of two plastic layers to become fused. The array of heat sealers is then radially withdrawn and indexed 45° and the sealing operation repeated. The arcuate sealers may be some 47° or so to ensure a slight overlay in creating a 360° seal. The now-bonded sheet and tube is then removed from the mandrel.

If the tube is sufficiently rigid it may effectively serve as its own mandrel. In that case a hole is cut in the flexible sheet of a size less than the tube. The sheet is stretched over an end of the rigid tube bringing a portion of the sheet about its hole snugly over the tube end. That portion is then heat sealed to the tube end. If necessary, the tube may nevertheless be mounted in some manner to prevent it from moving during the joining procedure.

It thus is seen that a new method is provided for joining a flexible plastic sheet to a plastic tube in a simple and economical manner with a seal that is substantially free of pin holes and capillary channels that create leakage. The preferred embodiment shows the sheet being sealed to the tube end much as a flange. However, it may be sealed to a more central portion of the tube by fitting that other portion on the mandrel in alignment with the heat sealing dies. Moreover, multiple sheets may be sealed to the tube in a series. Other variations will also be apparent to those skilled in this art without departure from the spirit and scope of the invention as set forth in the following claims.

What is claimed is:

1. A method of joining a plastic tube to a flexible plastic sheet wherein an end of the tube is mounted over a mandrel of a given size, a hole is cut in the sheet of a size less than the mandrel size, the sheet is stretched over the mandrel bringing an annular portion of the sheet about the hole snugly over the tube end and mandrel, the sheet annular portion is heat sealed to the tube end, and the sheet and tube are removed from the mandrel.

2. A method of joining a plastic tube to a flexible plastic sheet wherein an end portion of the tube is fitted over a generally cylindrical mandrel of a given diameter, a generally circular hole is cut in the sheet of a diameter less than the mandrel diameter, the sheet is stretched over the mandrel to bring a peripheral portion of the sheet about the hole over the tube end portion and mandrel, the sheet peripheral portion is heat sealed to the tube end portion, and the sheet and tube are removed from the mandrel.

* * * * *